United States Patent [19]

Schnabel et al.

[11] 4,385,171

[45] May 24, 1983

[54] REMOVAL OF UNREACTED DIISOCYANATE FROM POLYURETHANE PREPOLYMERS

[75] Inventors: Wilhelm J. Schnabel, Branford; James M. O'Connor, Clinton, both of Conn.

[73] Assignee: Olin Corporation Research Center, New Haven, Conn.

[21] Appl. No.: 373,368

[22] Filed: Apr. 30, 1982

[51] Int. Cl.$^3$ ............................................. C08G 18/82
[52] U.S. Cl. ...................... 528/491; 260/453 SP; 560/25; 560/115; 560/158; 528/494; 528/497; 528/501
[58] Field of Search .............. 528/491, 494, 497, 501; 260/453 SP; 560/25, 115, 158

[56] References Cited

U.S. PATENT DOCUMENTS

| | | | |
|---|---|---|---|
| 2,884,362 | 4/1959 | Bloom et al. | 202/57 |
| 3,183,112 | 5/1965 | Gemassmer | 106/316 |
| 3,248,372 | 4/1966 | Bunge | 528/73 |
| 3,384,624 | 5/1968 | Heiss | 528/49 |
| 3,804,844 | 4/1974 | Pews et al. | 71/94 |
| 3,817,933 | 6/1974 | Niederdellmann et al. | 528/501 |
| 3,883,577 | 5/1975 | Rabizzoni et al. | 528/52 |
| 4,061,662 | 12/1977 | Marans et al. | 560/26 |
| 4,169,175 | 9/1979 | Marans et al. | 528/59 |

*Primary Examiner*—Maurice J. Welsh
*Attorney, Agent, or Firm*—William A. Simmons; T. P. O'Day

[57] ABSTRACT

Unreacted diisocyanate is removed from a polyurethane prepolymer reaction product mixture by co-distillation of the unreacted diisocyanate with a compound which is at least partially miscible with the prepolymer and which boils at a temperature greater than the boiling point of the diisocyanate. A highly efficient removal rate is achieved in that the concentration of unreacted diisocyanate remaining in the reaction product mixture is generally less than about 0.1 percent, and in many cases less than about 0.05 percent, based on the weight of the prepolymer.

10 Claims, No Drawings

REMOVAL OF UNREACTED DIISOCYANATE FROM POLYURETHANE PREPOLYMERS

This invention relates to an improved process for removing unreacted diisocyanate from polyurethane prepolymers.

Polyurethane prepolymers obtained by reacting an organic diisocyanate with a polyol are commonly used in industry to make a wide variety of cellular and non-cellular polyurethane products. In preparing the prepolymer, a stoichiometric excess of diisocyanate (i.e. an equivalent NCO/OH ratio of greater than 2/1) is generally employed. However, the use of such relative proportions of the reactants leads to an increase in the amount of unreacted diisocyanate in the prepolymer reaction product. This has been found to be undesirable, because diisocyanate vapors are believed to be toxic to humans, and may pose a health hazard to workers exposed to high diisocyanate levels over an extensive period of time.

A number of processes have been developed in an effort to reduce the unreacted diisocyanate content in polyurethane prepolymers. For example, one technique involves distilling the prepolymer under vacuum conditions. Although some diisocyanate removal can be achieved according to this method, the prepolymer still generally contains an unsatisfactorily high diisocyanate content, usually in excess of 1.0 percent based on the weight of the prepolymer. In another approach, unreacted diisocyanate removal is performed by passing the prepolymer product mixture through a column containing absorbent type X zeolite molecular sieves. See U.S. Pat. No. 4,061,662 issued to Maraus et al. on Sept. 25, 1979. While this process may improve unreacted diisocyanate removal efficiency, there is still a need in the art for an improved process which will accomplish enhanced removal rates.

According to the present invention, it has now been discovered that an improved removal of unreacted diisocyanate from polyurethane prepolymers can be achieved. In practicing the process of the present invention, unreacted diisocyanate is distilled from the prepolymer reaction product mixture in the presence of a compound which is at least partially miscible with the prepolymer and which boils at a temperature greater than the boiling point of the diisocyanate. It has been found that the unreacted diisocyanate content in the prepolymer can be reduced to virtually negligible amounts.

The polyurethane prepolymer that is utilized according to the present invention is prepared by reacting an organic diisocyanate with a polyol using standard procedures known in the art. See Saunders, J. H. and Frisch, K. C., Polyurethanes, Chemistry and Technology: Part II, New York, Interscience Publishers, 1964, the entire disclosure of which is incorporated herein by reference. In carrying out the reaction, an equivalent NCO/OH ratio from about 1.2/1 to about 3/1, and preferably from about 2/1 to about 2.5/1 is employed.

Suitable organic diisocyanates include toluene diisocyanate, such as the 80:20 and the 65:35 mixtures of the 2,4- and 2,6-isomers, ethylene diisocyanate, propylene diisocyanate, methylene-bis (4-phenyl) isocyanate, methylene-bis (4-cyclohexyl) isocyanate, xylene diisocyanate, 3,3'-bitoluene-4,4'-diisocyanate, hexamethylene diisocyanate, naphthalene-1,5-diisocyanate, isophorone diisocyanate, and the like, and mixtures thereof. In accordance with a particularly preferred embodiment of the invention, there is employed an isomeric mixture of 2,4- and 2,6-toluene diisocyanate in which the weight ratio of the 2,4-isomer to the 2,6-isomer is from about 60:40 to about 90:10, and more preferably from about 65:35 to about 80:20.

The polyol reactant used in the polyurethane prepolymer formation preferably is a polyether polyol, a polyester polyol or a mixture of two or more such compounds. The polyol, or mixture of polyols, preferably should have a molecular weight from about 62 to about 7,000. The average functionality of the polyol or polyol blend is usually about 2 to about 8, and preferably about 2 to about 4.

The polyester polyols include the products of reacting polycarboxylic acids with polyhydric alcohols. Illustrative polycarboxylic acids include, for example, oxalic, malonic, succinic, glutaric, adipic, pimelic, suberic, azelaic, and the like, and mixtures thereof. Illustrative polyhydric alcohols include various diols, triols, tetrols and higher functionality alcohols, such as ethylene glycol, 1,3-propylene glycol, 1,2-propylene glycol, butylene glycols, butane diols, pentane diols, glycerol, trimethylolpropane, trimethylolhexane, pentaerythritol, sorbitol, hexane 1,2,6-triol, 2-methyl glucoside, and the like, and mixtures thereof.

Suitable polyether polyols include various polyoxyalkylene polyols and mixtures thereof. These can be prepared, according to well-known methods, by condensing an alkylene oxide, or a mixture of alkylene oxides using random or step-wise addition, with a polyhydric initiator or mixture of initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The most preferred alkylene oxide is propylene oxide or a mixture thereof with ethylene oxide using random or step-wise oxyalkylation.

The polyhydric initiator used in preparing the polyether polyol reactant includes the following and mixtures thereof: (a) aliphatic diols, such as ethylene glycol, 1,3-propylene glycol, 1,2-propylene glycol, butylene glycols, butane diols, pentane diols, and the like; (b) aliphatic triols, such as glycerol, trimethylolpropane, triethylolpropane, trimethylolhexane, and the like; (c) higher functionality alcohols, such as sorbitol, pentaerythritol, methyl glucoside, and the like; (d) polyamines, such as tetraethylene diamine; and (e) alkanolamines, such as diethanolamine, triethanolamine, and the like.

A preferred group of polyhydric initiators for use in preparing the polyether polyol reactant is one which comprises aliphatic diols and triols such as ethylene glycol, propylene glycol, dipropylene glycol, glycerol, trimethylolpropane, and the like.

In preparing the polyether polyol, the oxyalkylation reaction is allowed to proceed until the desired molecular weight is reached, at which time the reaction is terminated and the resulting polyol is recovered. As noted above, the molecular weight of the resulting polyol preferably ranges from about 62 to about 7,000; more preferably, the polyether polyol has a molecular weight of about 500–3,000.

According to the invention, the compounds which may be employed in carrying out the co-distillation process must be at least partially miscible with the diisocyanate and boil at a temperature greater than the boiling point of the diisocyanate. It should be noted that the added compounds do not contain functional groups which are reactive with the organic diisocyanate or the polyether polyol reactants used in preparing the prepolymer. In a preferred embodiment of the invention, the diisocyanate is toluene diisocyanate, most preferably a mixture of the 2,4- and 2,6-toluene diisocyanate isomers as noted above. In practicing this preferred embodiment, suitable compounds which may be employed include: polyalkylene polyol-diethers, aryl alkanes, alkyl esters, such as alkyl esters of aliphatic mono- and di-carboxylic acids and phthalic acid alkyl esters, and the like, and mixtures thereof. Illustrative compounds are tetraethyleneglycol dimethylether, diphenylmethane, diphenylethane, phthalic acid dimethylester, diethyl pimelate, and the like, and mixtures thereof. The amount of the compound to be added will depend generally on the particular polyurethane prepolymer-unreacted organic diisocyanate reaction mixture being treated, the particular compound being employed, and the distillation conditions. Generally, however, the compound is used in an amount from about 1 to about 15 percent, and preferably from about 2 to about 8 percent, based on the total weight of the prepolymer.

Preferably, the co-distillation process of the invention is performed by adding the selected compound to the crude reaction product derived from the reaction between the organic diisocyanate and the polyether polyol, and then subjecting the resulting mixture to distillation conditions. If desired, however, the compound can be added to the reactants used in forming the prepolymer, or at any time during the reaction. In general, the co-distillation process is carried out in a conventional manner, the actual conditions being dependent upon the diisocyanate being removed, the other components of the distillation mixture, etc. Usually, however, the distillation temperature ranges from about 80° C. to about 140° C., preferably from about 100° C. to about 120° C. The distillation pressure will typically range from about 0.05 to about 10 mm Hg, with a pressure of about 0.5 to about 5 mm Hg being preferred.

The co-distillation process of the invention can be carried out batchwise, semicontinuously or continuously. It is also contemplated that the process may be performed by recycling at least a portion of the distillate for further unreacted diisocyanate removal. Other modifications within the scope of the invention will be apparent to those skilled in the art.

The prepolymer products obtained by practicing the process of the invention have a wide variety of useful applications. For example, they have utility in the preparation of numerous polyurethane products, such as foams, adhesives, etc.

The following examples are provided to further illustrate the invention. All parts are by weight unless otherwise specified.

PREPARATION OF POLYURETHANE PREPOLYMER

EXAMPLE 1

A polyurethane prepolymer was prepared in conventional fashion by first reacting 500 parts of a polyether polyol[1] with 207 parts of toluene diisocyanate[2]. The reaction mixture was then heated to 75° C. and maintained at this temperature with stirring for 4 hours. After cooling to room temperature, a portion of the reaction product was extracted with petroleum ether and the extract was analyzed for toluene diisocyanate content using gas chromatography with ortho-dichlorobenzene as an internal standard. The results showed that the prepolymer product contained 2.0 percent free, unreacted toluene diisocyanate monomer.

1. A polyether triol having a molecular weight of 1,400 and which is the product of condensing glycerin first with 15.6 moles of propylene oxide and then with 9 moles of ethylene oxide.
2. A mixture of toluene diisocyanate isomers (80:20 mixture of 2,4/2,6-isomers).

EXAMPLE 2

A polyurethane prepolymer was prepared by repeating the procedure of Example 1 using the same ingredients in the same proportions. The analytical results showed, however, that the prepolymer product contained 2.4 percent free, unreacted toluene diisocyanate monomer.

EXAMPLE 3

A polyurethane prepolymer was prepared according to the procedure of Example 1. In preparing the prepolymer, 1600 parts of a polyether polyol[1] were reacted with 300 parts of toluene diisocyanate[2]. The results showed that the prepolymer product contained 4.15 percent free, unreacted toluene diisocyanate monomer.

1. A polyether diol having a molecular weight of 2,000 and which is the product of condensing dipropylene glycol with 32 moles of propylene oxide.
2. A mixture of toluene diisocyanate isomers (80:20 mixture of 2,4/2,6-isomers).

REMOVAL OF UNREACTED TOLUENE DIISOCYANATE

COMPARATIVE EXAMPLE A

A portion of the polyurethane prepolymer of Example 1 was heated at 100° C. under vacuum conditions (less than 1.0 mm Hg) for 3 hours. Subsequent analysis showed that the prepolymer product contained 1.17 percent free, unreacted toluene diisocyanate monomer. The sample was then heated again, this time at 120° C., under vacuum conditions for 3 hours. Analysis then showed that the prepolymer product still contained 1.10 percent free, unreacted toluene diisocyanate monomer.

EXAMPLE 4

A portion of the polyurethane prepolymer of Example 1 was heated at 100° C. under vacuum conditions (less than 1.0 mm Hg) for 3 hours. Prior to heating, however, there was added to the portion a small amount of tetraethyleneglycol dimethylether. The results showed that a mixture of tetraethyleneglycol dimethylether and toluene diisocyanate distilled from the prepolymer, indicating removal of free, unreacted toluene diisocyanate monomer. The product was analyzed by extracting a sample with petroleum ether and then utilizing gas chromatography as described above under Example 1. The results are shown in Table I.

EXAMPLES 5–7

Portions of the polyurethane prepolymer of Example 2 were heated at 100° C. under vacuum conditions (less than 1.0 mm Hg) for 3 hours. Prior to heating, however, there was added to each portion a small amount of a selected compound, as set forth in Table I. The results showed that in each case a mixture of the added compound and toluene diisocyanate distilled from the prepolymer, indicating removal of free, unreacted toluene diisocyanate monomer. The product was analyzed by extracting a sample with petroleum ether and then utilizing gas chromatography as described above under Example 1. See Table I for a summary of the results.

EXAMPLE 8

Following the procedure of Examples 5-7, a small amount of diphenylmethane was added to the polyurethane prepolymer of Example 3, which was then heated. The product was analyzed by extracting a sample with petroleum ether and then utilizing gas chromatography as described above under Example 1. The results are shown in Table I.

TABLE I
REMOVAL OF UNREACTED TOLUENE DIISOCYANATE

| Example | Compound Added | Prepolymer Product Before Distillation | | Prepolymer Product After Distillation | |
|---|---|---|---|---|---|
| | | % Compound | % Toluene Diisocyanate | % Compound | % Toluene Diisocyanate |
| Comparative Example A | — | — | 2.0 | — | 1.10 |
| Example 4 | Tetraethyleneglycol dimethylether | 5.3 | 2.0 | 0.59 | 0.09 |
| Example 5 | Phthalic acid dimethylester | 8.0 | 2.4 | 0.22 | <0.05 |
| Example 6 | Diphenylethane | 4.1 | 2.4 | 0.35 | <0.05 |
| Example 7 | Diethyl pimelate | 5.2 | 2.4 | 0.35 | 0.05 |
| Example 8 | Diphenylmethane | 5.0 | 4.15 | 0.2 | None detectable |

What is claimed is:

1. A process for reducing the amount of unreacted diisocyanate in a polyurethane prepolymer reaction product mixture, wherein said prepolymer is prepared by reacting an organic diisocyanate with a polyol and said mixture contains residual unreacted diisocyanate, said process comprising distilling said unreacted diisocyanate from said mixture in the presence of a compound which is at least partially miscible with said prepolymer and which boils at a temperature greater than the boiling point of said diisocyanate and which is unreactive with said diisocyanate.

2. The process of claim 1, wherein said organic diisocyanate is toluene diisocyanate.

3. The process of claim 2, wherein said compound is selected from the group consisting of polyalkylene polyol-diethers, aryl alkanes, alkyl esters, and mixtures thereof.

4. The process of claim 3, wherein said compound is selected from the group consisting of tetraethyleneglycol dimethylether, diphenylmethane, diphenylethane, phthalic acid dimethylester, diethyl pimelate, and mixtures thereof.

5. The process of claim 4, wherein said compound is employed in a proportion from about 2 to about 8 percent by weight based on the total weight of said prepolymer.

6. The process of claim 2, wherein the equivalent NCO/OH ratio employed in forming said prepolymer is from about 2/1 to about 2.5/1.

7. The process of claim 6, wherein said polyol is a polyether polyol and has a molecular weight from about 500 to about 3,000 and an average functionality from about 2 to about 4.

8. The process of claim 7, wherein said compound is selected from the group consisting of polyalkylene polyol-diethers, aryl alkanes, alkyl esters, and mixtures thereof.

9. The process of claim 8, wherein said compound is selected from the group consisting of tetraethyleneglycol dimethylether, diphenylmethane, diphenylethane, phthalic acid dimethylester, diethyl pimelate, and mixtures thereof.

10. The process of claim 9, wherein said compound is employed in a proportion from about 2 to about 8 percent by weight based on the total weight of said prepolymer.

* * * * *

UNITED STATES PATENT AND TRADEMARK OFFICE
CERTIFICATE OF CORRECTION

PATENT NO. : 4,385,171

DATED : May 24, 1983

INVENTOR(S) : Wilhelm J. Schnabel, James M. O'Connor

It is certified that error appears in the above-identified patent and that said Letters Patent is hereby corrected as shown below:

On the Title Page after "[73] Assignee:" delete "Olin Corporation Research Center" and insert --Olin Corporation--.

Signed and Sealed this

Twenty-fifth Day of October 1983

[SEAL]

Attest:

GERALD J. MOSSINGHOFF

Attesting Officer

Commissioner of Patents and Trademarks